United States Patent [19]
Croteau et al.

[11] Patent Number: 5,566,217
[45] Date of Patent: Oct. 15, 1996

[54] REDUCED HEIGHT SPACER FOR NUCLEAR FUEL RODS

[75] Inventors: Edward A. Croteau; Donald G. Muncy, both of Wilmington; Eric B. Johansson, Wrightsville Beach, all of N.C.

[73] Assignee: General Electric Company, Schenectady, N.Y.

[21] Appl. No.: 380,591

[22] Filed: Jan. 30, 1995

[51] Int. Cl.$^6$ ..................................................... G21C 3/34
[52] U.S. Cl. ........................... 376/442; 376/441; 376/462; 376/438; 376/439
[58] Field of Search ........................... 376/442, 441, 376/462, 440, 438, 439; 976/DIG. 73, DIG. 74, DIG. 80

[56] References Cited

U.S. PATENT DOCUMENTS

| 3,344,855 | 10/1967 | Clark | 168/159 |
|---|---|---|---|
| 3,350,276 | 10/1967 | Warberg et al. | 176/78 |
| 3,457,140 | 7/1969 | Glandin | 176/78 |
| 3,510,397 | 5/1970 | Zettervall | 376/442 |
| 3,746,619 | 7/1973 | Iwao | 376/442 |
| 3,749,640 | 7/1973 | Israel | 176/78 |
| 3,809,609 | 5/1974 | Krawiec et al. | 176/78 |
| 3,886,038 | 5/1975 | Raven | 176/78 |
| 3,944,779 | 3/1976 | Umino et al. | 219/121 EM |
| 4,005,521 | 2/1977 | Kaplan et al. | 29/469 |
| 4,039,379 | 8/1977 | Patterson et al. | 376/439 |
| 4,061,536 | 12/1977 | Creagan et al. | 371/439 |
| 4,069,102 | 1/1978 | Berringer et al. | 376/463 |
| 4,077,843 | 3/1978 | Patterson et al. | 376/442 |
| 4,086,809 | 5/1978 | Wu et al. | 73/161 |
| 4,089,742 | 5/1978 | Amaral et al. | 376/440 |
| 4,108,719 | 8/1978 | Olshausen | 376/245 |
| 4,119,489 | 10/1978 | Itoh et al. | 376/444 |
| 4,124,444 | 11/1978 | Jabsen | 376/444 |
| 4,125,435 | 11/1978 | Jabsen | 376/442 |
| 4,137,125 | 1/1979 | Walters | 376/442 |
| 4,142,934 | 3/1979 | Wild | 376/434 |
| 4,172,761 | 10/1979 | Raven et al. | 376/462 |
| 4,175,003 | 11/1979 | Beuchel et al. | 376/442 |

(List continued on next page.)

FOREIGN PATENT DOCUMENTS

| 0192092 | 1/1989 | European Pat. Off. . |
|---|---|---|
| 0210526 | 5/1989 | European Pat. Off. . |
| 0237064 | 3/1991 | European Pat. Off. . |
| 0428093 | 5/1991 | European Pat. Off. . |
| 0428092 | 5/1991 | European Pat. Off. . |
| 0273183 | 8/1991 | European Pat. Off. . |
| 0489334 | 6/1992 | European Pat. Off. . |
| 0503553 | 9/1992 | European Pat. Off. . |
| 0330013 | 11/1992 | European Pat. Off. . |
| 0514115 | 11/1992 | European Pat. Off. . |
| 0514116 | 11/1992 | European Pat. Off. . |
| 0514117 | 11/1992 | European Pat. Off. . |
| 0514120 | 11/1992 | European Pat. Off. . |
| 0518306 | 12/1992 | European Pat. Off. . |
| 0539867 | 5/1993 | European Pat. Off. . |
| 1-1384493 | 5/1989 | Japan . |
| 2-163695 | 6/1990 | Japan . |
| 454824 | 5/1988 | Sweden . |
| 454823 | 5/1988 | Sweden . |
| 1153444 | 5/1969 | United Kingdom . |

Primary Examiner—Charles T. Jordan
Assistant Examiner—Meena Chelliah
Attorney, Agent, or Firm—Nixon & Vanderhye

[57] ABSTRACT

A spacer includes a plurality of ferrules welded to one another to form a structural integral matrix for locating fuel rods in a fuel bundle. Each ferrule has a pair of stops along one side of the ferrule and a central opening along its opposite side. An elongated flat spring having openings straddling a central cross-piece is disposed along an outer edge of the ferrule with the spring openings receiving band portions of the ferrule above and below the opening through the ferrule. The intermediate cross-piece bears against an adjoining ferrule whereby the end portions of the spring bear against the rod in the one ferrule, biasing it against the opposite stops. Thus ferrule/spring construction reduces the quantity of material of the ferrule, thereby improving performance without sacrificing structural integrity.

14 Claims, 5 Drawing Sheets

U.S. PATENT DOCUMENTS

| | | | |
|---|---|---|---|
| 4,190,494 | 2/1980 | Olsson | 376/462 |
| 4,224,107 | 9/1980 | Delafosse et al. | 376/462 |
| 4,239,597 | 12/1980 | Christiansen | 376/441 |
| 4,246,783 | 1/1981 | Steven et al. | 73/161 |
| 4,268,356 | 5/1981 | Kmonk et al. | 376/462 |
| 4,312,705 | 1/1982 | Steinke | 376/441 |
| 4,313,797 | 2/1982 | Attix | 376/441 |
| 4,325,786 | 4/1982 | Wohlsen | 376/442 |
| 4,357,298 | 11/1982 | Wolters, Jr. et al. | 376/441 |
| 4,391,771 | 7/1983 | Anthony | 376/451 |
| 4,396,573 | 8/1983 | Feutrel | 376/442 |
| 4,416,852 | 11/1983 | Nylund | 376/438 |
| 4,418,036 | 11/1983 | Gjertsen et al. | 371/438 |
| 4,420,458 | 12/1983 | Dunlap et al. | 376/447 |
| 4,435,357 | 3/1984 | Krieger | 376/272 |
| 4,454,093 | 6/1984 | Nylund et al. | 376/282 |
| 4,474,730 | 10/1984 | Hellman et al. | 376/462 |
| 4,478,786 | 10/1984 | Andersson et al. | 376/444 |
| 4,489,038 | 12/1984 | Nylund | 376/446 |
| 4,491,540 | 1/1985 | Larker et al. | 252/628 |
| 4,492,844 | 1/1985 | Kobuck et al. | 219/121 |
| 4,499,047 | 2/1985 | Borrman et al. | 376/434 |
| 4,508,679 | 4/1985 | Matzner et al. | 371/438 |
| 4,512,820 | 4/1985 | Mori et al. | 148/17.7 N |
| 4,521,374 | 6/1985 | Duncan | 376/462 |
| 4,522,330 | 6/1985 | Kerrey et al. | 228/182 |
| 4,526,744 | 7/1985 | Borrman et al. | 376/440 |
| 4,526,745 | 7/1985 | Nylund et al. | 376/444 |
| 4,526,746 | 7/1985 | Fredin | 376/444 |
| 4,540,545 | 9/1985 | Kondo | 376/364 |
| 4,544,522 | 10/1985 | Curulla et al. | 376/441 |
| 4,556,531 | 12/1985 | Curulla | 376/441 |
| 4,557,892 | 12/1985 | Komoda | 376/412 |
| 4,571,324 | 2/1986 | Johansson et al. | 376/441 |
| 4,578,240 | 3/1986 | Cadwell | 376/441 |
| 4,579,711 | 4/1986 | Mishima et al. | 376/442 |
| 4,585,614 | 4/1986 | Helmersson | 376/434 |
| 4,585,616 | 4/1986 | DeMario et al. | 376/442 |
| 4,587,093 | 5/1986 | Borrman et al. | 376/444 |
| 4,587,704 | 5/1986 | Matzner et al. | 29/446 |
| 4,588,550 | 5/1986 | Blomstrand et al. | 376/438 |
| 4,597,937 | 7/1986 | Sakurai et al. | 376/441 |
| 4,617,170 | 10/1986 | Suchy | 376/438 |
| 4,632,804 | 12/1986 | Wallander et al. | 376/444 |
| 4,645,643 | 2/1987 | Leclercq | 376/447 |
| 4,646,021 | 2/1987 | Brown | 324/30.3 |
| 4,649,021 | 3/1987 | Taleyarkhan | 376/441 |
| 4,652,426 | 3/1987 | Boyle et al. | 376/352 |
| 4,654,193 | 3/1987 | Amano et al. | 376/436 |
| 4,655,995 | 4/1987 | Freeman et al. | 376/267 |
| 4,656,000 | 4/1987 | Sakurai et al. | 376/352 |
| 4,659,541 | 4/1987 | Rylatt | 371/442 |
| 4,659,542 | 4/1987 | Kerrey | 376/442 |
| 4,659,543 | 4/1987 | Lui | 376/444 |
| 4,661,220 | 4/1987 | Fejes et al. | 209/141.5 |
| 4,664,882 | 5/1987 | Doshi | 376/423 |
| 4,665,866 | 5/1987 | Wepfer | 122/510 |
| 4,666,657 | 5/1987 | Altman | 376/234 |
| 4,666,663 | 5/1987 | Steinke | 376/441 |
| 4,666,664 | 5/1987 | Doshi | 376/261 |
| 4,671,926 | 6/1987 | Broberg et al. | 376/364 |
| 4,675,154 | 6/1987 | Nelson et al. | 376/444 |
| 4,683,115 | 7/1987 | Frömel | 376/439 |
| 4,686,079 | 8/1987 | Ishikawa et al. | 376/444 |
| 4,689,091 | 8/1987 | Yoshida et al. | 148/11.5 F |
| 4,692,302 | 9/1987 | DeMario et al. | 376/439 |
| 4,692,303 | 9/1987 | Osborne | 376/446 |
| 4,695,426 | 9/1987 | Nylund | 376/441 |
| 4,698,204 | 10/1987 | Taleyarkhan | 376/439 |
| 4,702,881 | 10/1987 | Weiland et al. | 376/442 |
| 4,705,663 | 11/1987 | Steven et al. | 371/442 |
| 4,707,328 | 11/1987 | Arbink et al. | 376/446 |
| 4,708,845 | 11/1987 | Mildrum et al. | 376/435 |
| 4,711,436 | 12/1987 | Kobuck et al. | 269/40 |
| 4,714,585 | 12/1987 | Kast | 376/442 |
| 4,716,011 | 12/1987 | Taleyarkhan | 376/281 |
| 4,716,016 | 12/1987 | DeMario et al. | 376/446 |
| 4,725,403 | 2/1988 | Buettiker | 376/439 |
| 4,726,926 | 2/1988 | Patterson et al. | 376/439 |
| 4,728,490 | 3/1988 | Taleyarkhan | 376/439 |
| 4,729,867 | 3/1988 | DeMario | 376/261 |
| 4,735,766 | 4/1988 | Scharpenberg | 376/245 |
| 4,735,769 | 4/1988 | Lettau | 376/441 |
| 4,738,819 | 4/1988 | Taleyarkhan | 376/444 |
| 4,738,821 | 4/1988 | Shallenberger et al. | 376/444 |
| 4,740,350 | 4/1988 | Taleyarkhan | 376/441 |
| 4,740,351 | 4/1988 | Katsumizu et al. | 376/446 |
| 4,744,942 | 5/1988 | Ferrari et al. | 376/442 |
| 4,749,547 | 6/1988 | Blomstrand et al. | 376/444 |
| 4,753,774 | 6/1988 | Taleyarkhan et al. | 376/444 |
| 4,756,878 | 7/1988 | King et al. | 376/439 |
| 4,758,403 | 7/1988 | Noailly | 376/439 |
| 4,759,912 | 7/1988 | Taleyarkhan | 376/435 |
| 4,770,843 | 9/1988 | Taleyarkhan | 376/216 |
| 4,775,509 | 10/1988 | Noailly et al. | 376/442 |
| 4,780,273 | 10/1988 | Dressel | 376/441 |
| 4,784,825 | 11/1988 | Busselman et al. | 376/399 |
| 4,793,963 | 12/1988 | DeMario et al. | 376/267 |
| 4,795,608 | 1/1989 | Nylund | 376/444 |
| 4,803,043 | 2/1989 | DeMario et al. | 376/442 |
| 4,804,516 | 2/1989 | Thomazet et al. | 376/439 |
| 4,818,471 | 4/1989 | Thomson et al. | 376/254 |
| 4,818,473 | 4/1989 | Lui | 376/261 |
| 4,818,478 | 4/1989 | Taleyarkhan | 376/435 |
| 4,828,782 | 5/1989 | Donnelly | 376/252 |
| 4,839,136 | 6/1989 | DeMario et al. | 376/462 |
| 4,844,860 | 7/1989 | Hatfield | 376/439 |
| 4,849,161 | 7/1989 | Brown et al. | 376/439 |
| 4,859,407 | 8/1989 | Nylund | 376/446 |
| 4,869,865 | 9/1989 | White et al. | 376/260 |
| 4,879,090 | 11/1989 | Perrotti et al. | 376/462 |
| 4,885,127 | 12/1989 | Yokoyama | 376/462 |
| 4,895,698 | 1/1990 | DeMario | 371/442 |
| 4,913,707 | 4/1990 | Moreno et al. | 29/792 |
| 4,913,875 | 4/1990 | Johansson et al. | 376/439 |
| 4,924,586 | 5/1990 | King, Jr. et al. | 29/92.3 |
| 4,931,615 | 6/1990 | Muncy et al. | 219/121.67 |
| 4,946,587 | 8/1990 | Reeves et al. | 209/539 |
| 4,957,697 | 9/1990 | Wada | 376/442 |
| 4,970,048 | 11/1990 | Noailly | 376/439 |
| 4,980,121 | 12/1990 | Roberts et al. | 376/439 |
| 4,988,474 | 1/1991 | Hoffmann et al. | 376/261 |
| 4,994,234 | 2/1991 | Nylund | 376/443 |
| 4,999,153 | 3/1991 | Johansson et al. | 376/443 |
| 5,002,726 | 3/1991 | Johansson | 376/448 |
| 5,024,807 | 6/1991 | Hatfield et al. | 376/352 |
| 5,024,810 | 6/1991 | Bachman | 376/438 |
| 5,032,351 | 7/1991 | Johansson | 376/438 |
| 5,035,853 | 7/1991 | Lettau et al. | 376/441 |
| 5,069,864 | 12/1991 | Johansson | 376/441 |
| 5,078,961 | 1/1992 | Johansson et al. | 376/448 |
| 5,080,858 | 1/1992 | Nylund | 376/443 |
| 5,085,827 | 2/1992 | Johansson et al. | 376/444 |
| 5,089,220 | 2/1992 | Nylund | 376/439 |
| 5,089,221 | 2/1992 | Johansson et al. | 376/442 |
| 5,091,145 | 2/1992 | Petit | 376/441 |
| 5,094,805 | 3/1992 | Suchy et al. | 376/438 |
| 5,096,660 | 3/1992 | Hembjer et al. | 376/438 |
| 5,110,539 | 5/1992 | Perrotti et al. | 376/439 |
| 5,128,097 | 7/1992 | Fukasawa et al. | 376/438 |
| 5,130,083 | 7/1992 | Johansson | 376/441 |
| 5,139,736 | 8/1992 | Bryan | 376/442 |

| | | | | | | | |
|---|---|---|---|---|---|---|---|
| 5,147,600 | 9/1992 | Kadono et al. | 376/462 | 5,245,644 | 9/1993 | Büttner et al. | 376/442 |
| 5,149,495 | 9/1992 | Elkins | 376/444 | 5,253,278 | 10/1993 | Kanazawa et al. | 376/434 |
| 5,173,252 | 12/1992 | Johansson | 376/448 | 5,263,071 | 11/1993 | Farkas et al. | 376/438 |
| 5,174,949 | 12/1992 | Johansson | 376/439 | 5,267,291 | 11/1993 | Matzner et al. | 376/442 |
| 5,178,825 | 1/1993 | Johansson | 376/438 | 5,272,743 | 12/1993 | Yamazaki et al. | 376/463 |
| 5,180,548 | 1/1993 | Verdier | 376/439 | 5,313,506 | 5/1994 | Matzner et al. | 376/441 |
| 5,180,550 | 1/1993 | Nylund | 376/449 | 5,317,613 | 5/1994 | Fennern | 376/439 |
| 5,183,629 | 2/1993 | Canat et al. | 376/439 | 5,327,470 | 7/1994 | Johansson | 376/438 |
| 5,186,891 | 2/1993 | Johansson et al. | 376/438 | 5,343,504 | 8/1994 | Gaylord, Jr. et al. | 376/247 |
| 5,200,143 | 4/1993 | Johansson | 376/449 | 5,345,487 | 9/1994 | Johansson | 376/444 |
| 5,209,899 | 5/1993 | Johansson et al. | 376/442 | 5,361,288 | 11/1994 | Johansson | 376/441 |
| 5,211,908 | 5/1993 | Verdier | 376/442 | 5,371,768 | 12/1994 | Matzner | 376/441 |
| 5,226,633 | 7/1993 | Willard, Jr. | 267/159 | 5,375,154 | 12/1994 | Matzner et al. | 228/10 |
| 5,229,068 | 7/1993 | Johansson et al. | 376/371 | 5,375,756 | 12/1994 | Haughton et al. | 228/10 |
| 5,243,634 | 9/1993 | Bryan | 376/439 | 5,377,236 | 12/1994 | Smith et al. | 376/245 |

REDUCED HEIGHT SPACER FOR NUCLEAR FUEL RODS

TECHNICAL FIELD

The present invention relates to a spacer for nuclear fuel rods and particularly to a reduced height spacer having minimum spacer material with consequent minimum impact on fuel bundle performance.

BACKGROUND

In nuclear reactors, for example, a boiling water reactor, nuclear fuel rods are grouped together in an open-ended tubular flow channel, typically referred to as a fuel assembly or bundle. A plurality of fuel assemblies are positioned in the reactor core in a matrix and a coolant/moderator flows upwardly about the fuel rods for generating steam. Fuel rods are supported between upper and lower tie plates in side-by-side parallel arrays. Spacers are employed at predetermined elevations along the fuel bundle to restrain the fuel rods from bowing or vibrating during reactor operation.

Typical spacers often include a plurality of ferrules arranged in side-by-side relation and secured, for example, by welding to one another to form the support matrix of the spacer for the nuclear fuel rods. Generally, each ferrule includes circumferentially spaced protuberances and a spring assembly along an opposite side of the ferrule from the protuberances for centering and biasing each fuel rod against the protuberances, thereby maintaining the fuel rods in fixed relation one to the other across the spacer. Generally, the role of a spacer in a fuel bundle is to position the fuel rods for peak performance and to protect the fuel rod assembly during possible loading events, such as handling and shipping. The spacer itself, however, constitutes an obstacle to bundle performance in that its cross-section interferes with the flow of water/moderator through the bundle. An ideal spacer would have minimal impact on bundle performance (thermal hydraulics, critical power), while still restraining the rods in their intended positions and protecting them. Consequently, an optimum spacer should have as little cross-section as possible, use a minimum amount of material and simultaneously meet structural requirements for positioning and protecting the fuel rods.

DISCLOSURE OF THE INVENTION

According to the present invention, there is provided a spacer which employs ferrules to capture and retain the nuclear fuel rods in the bundle in the intended array. Ferrules are employed because of their excellent structural integrity as compared with other possible cross-sectional shapes. By shortening the height of the ferrule in accordance with the present invention, the structural integrity of the ferrule is retained, while simultaneously, the magnitude of the material employed in the spacer is greatly reduced. A separate spring, also having a reduced quantity of material, is provided for each ferrule and along a side thereof opposite a pair of stops formed along the interior ferrule surface. The spring constitutes a leaf spring extending above and below the opposite edges of the ferrule and having upper and lower contact points for engaging the fuel rod and biasing it against the stops. A central portion of the spring extends in a central opening of the ferrule and projects in an opposite direction toward an adjacent ferrule. Thus, the adjacent ferrule, which is welded to the one ferrule, provides a reaction force for the spring so that the spring biases the fuel rod in the one ferrule against its stops. That is, the spring preloads the fuel rod in one ferrule by engaging it at locations above and below the opposite edges of the one ferrule and engaging the adjacent ferrule to provide a reaction force for the spring. This ferrule configuration thus meets the requirements for a spacer having minimum material and cross-section and the necessary structural requirements.

In a preferred embodiment according to the present invention, there is provided a subassembly for a spacer useful in a nuclear fuel bundle for maintaining a matrix of a plurality of nuclear fuel rods passing through the spacer in spaced-apart relation, comprising first and second ferrules lying adjacent one another for receiving respective nuclear fuel rods, each ferrule having a pair of fuel rod contacting points along one side of the ferrule for abutting a fuel rod within the ferrule and an opening along a side of the ferrule opposite the one side, a spring including a spring body lying in a plane having opposite end portions projecting to one side of the plane, a central portion between the end portions projecting to the opposite side of the plane and openings on opposite sides of the central portion between the central portion and the end portions, the spring being disposed between the ferrules with the central portion in the central opening of the first ferrule and bearing against the second ferrule between the contacting points, portions of the first ferrule on opposite sides of the opening therethrough extending in respective openings of the spring, the end portions extending beyond opposite upper and lower edges of the first ferrule for bearing directly against a fuel rod passing through the first ferrule and biasing the fuel rod against the contacting points along the one side of the first ferrule.

In a further preferred embodiment according to the present invention, there is provided a spacer for maintaining a matrix of nuclear fuel rods in spaced-apart relation between upper and lower tie plates, the spacer assembly comprising a matrix of adjacent ferrules for receiving the fuel rods in the spacer, each ferrule having a pair of fuel rod contacting points along one side thereof for abutting a fuel rod within the ferrule and having an opening along a side of the ferrule opposite the one side, a plurality of springs, each spring including a spring body lying in a plane having opposite end portions projecting to one side of the plane, a central portion between the end portions projecting to the opposite side of the plane and openings on opposite sides of the central portion and between the central portion and the end portions, each spring being disposed between an adjacent pair of the ferrules with the central portion in the central opening of one of the adjacent ferrules and portions of the one ferrule on opposite sides of the opening therethrough extending in respective openings of the spring.

Accordingly, it is a primary object of the present invention to provide a novel and improved spacer for the nuclear fuel rods of a nuclear fuel bundle, affording improved performance by shortening the height of the spacer and minimizing its cross-section, hence reducing the spacer material while simultaneously providing the necessary structural integrity to maintain the fuel rods in position.

BEST MODE FOR CARRYING OUT THE INVENTION

Figure 1:
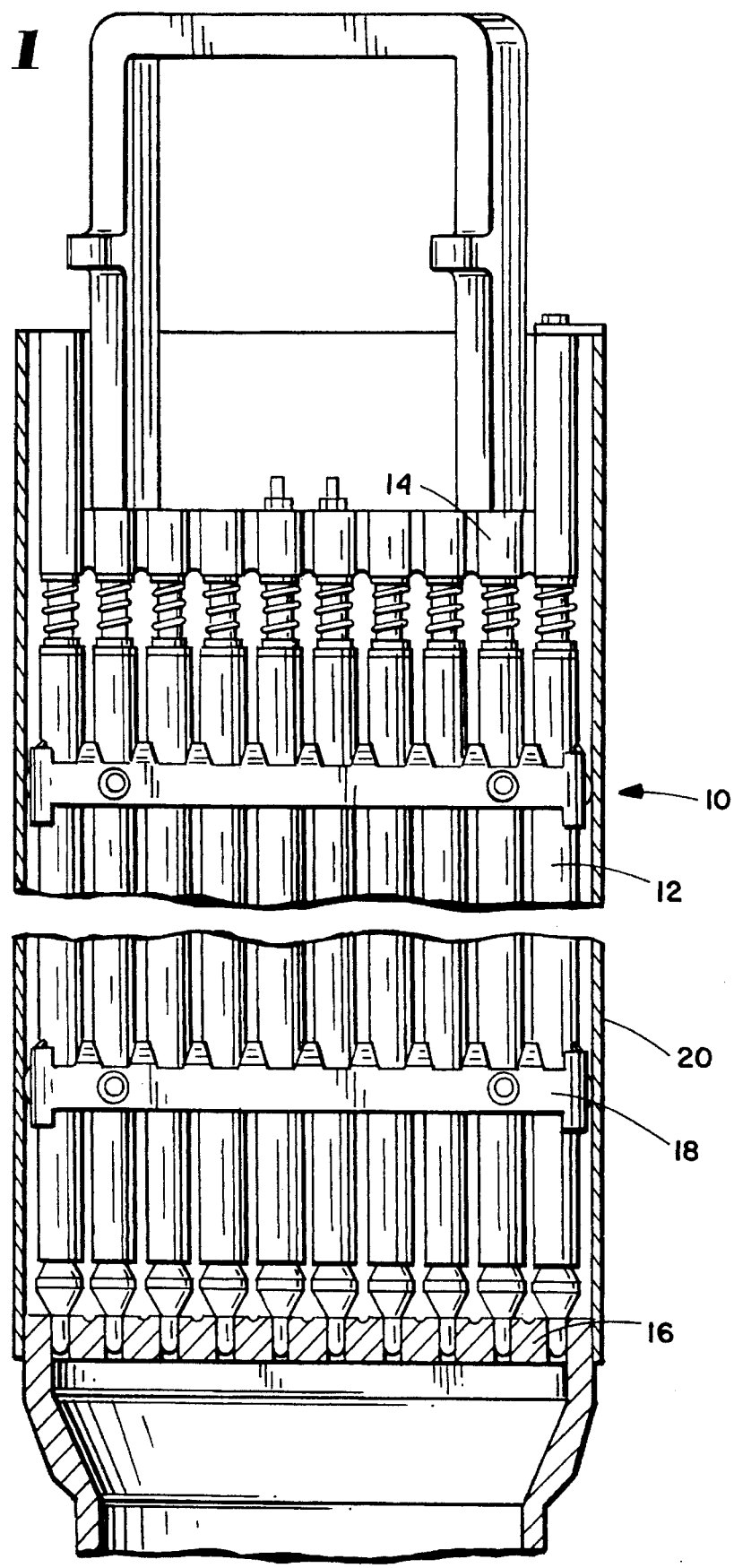
FIG. 1 is a side elevational view of a nuclear fuel bundle with portions broken out and in cross-section for ease of illustration.
Figure 2:
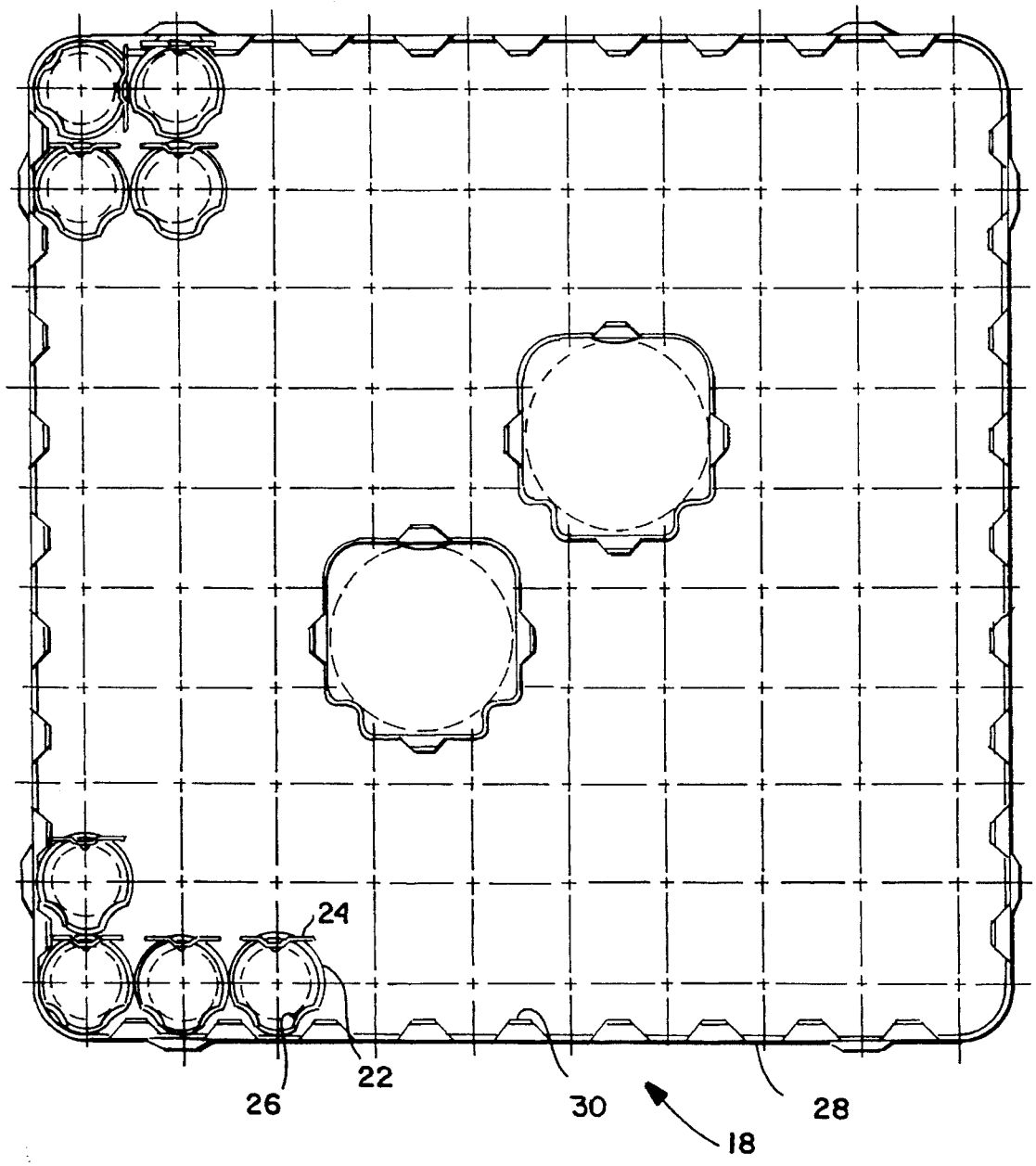
FIG. 2 is a plan view of a spacer showing the ferrule and spring assemblies of the present invention and with portions broken out for ease of illustration.
Figure 3:
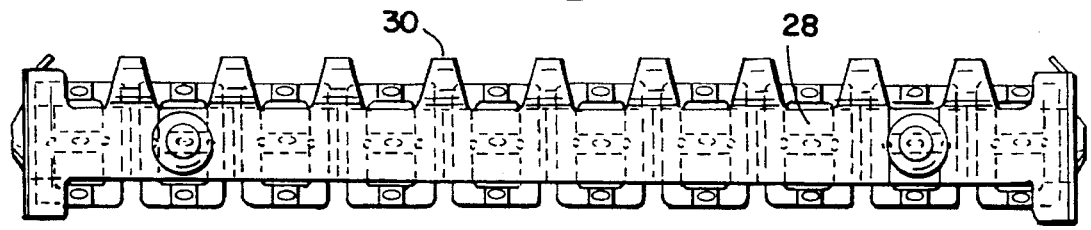
FIG. 3 is a side elevational view thereof.

Referring now to FIG. 1, there is illustrated a nuclear fuel assembly, generally designated 10, including a plurality of fuel elements or rods 12 supported between an upper tie plate 14 and a lower tie plate 16. Fuel rods 12 pass through a plurality of fuel rod spacers 18 at vertically spaced positions along the fuel bundle. The spacers 18 provide intermediate support to retain the elongated fuel rods 12 in spaced relation relative to one another and to restrain the fuel rods from lateral vibration. With reference to FIGS. 1 and 2, a 10×10 array of fuel rods is disclosed. It will be appreciated, however, that the invention hereof is applicable to arrays of fuel rods of different numbers, for example, 8×8 arrays.

Each fuel rod 18 is formed of an elongated tubular cladding material, with the nuclear fuel and other materials sealed in the tube by end plugs. The lower end plugs register in bores formed in the lower tie plate 16, while the upper end plugs are disposed in cavities in the upper tie plate 14. Additionally, the fuel rod assembly includes a channel 20 of substantially square cross-section sized to form a sliding fit over the upper and lower tie plates and the spacers so that the nuclear fuel bundle, including the channel, tie plates, rods and spacers can be removed.

Turning now to FIG. 2, there is illustrated a spacer 18 constructed in accordance with the present invention and having a plurality of individual ferrules 22 and springs 24, each ferrule having an associated spring. The ferrules 22 are arranged in a square matrix in which each ferrule receives a fuel rod and maintains the fuel rod spaced and restrained relative to adjoining fuel rods. The spring assembly 24 is provided each ferrule for purposes of biasing the fuel rod in a lateral direction against stops 26 opposite the springs whereby the fuel rods are maintained in a predetermined position relative to one another and in the spacer 18. Each spacer 18 also includes a marginal band 28 with inwardly directed upper flow tabs 30.

Figure 4:
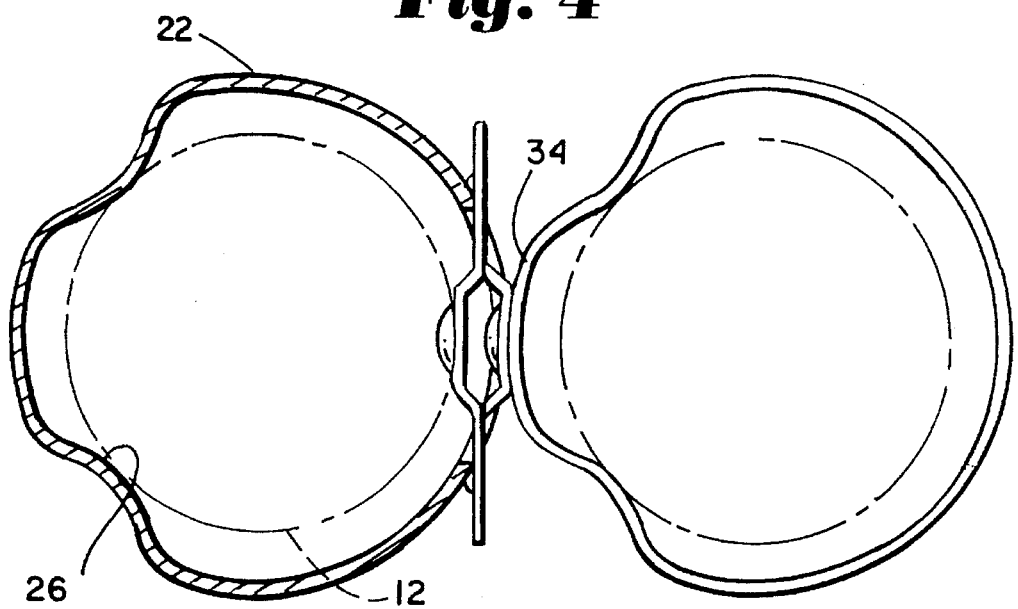
FIG. 4 is an enlarged cross-sectional view of a pair of adjoining spacer ferrules.
Figure 5:
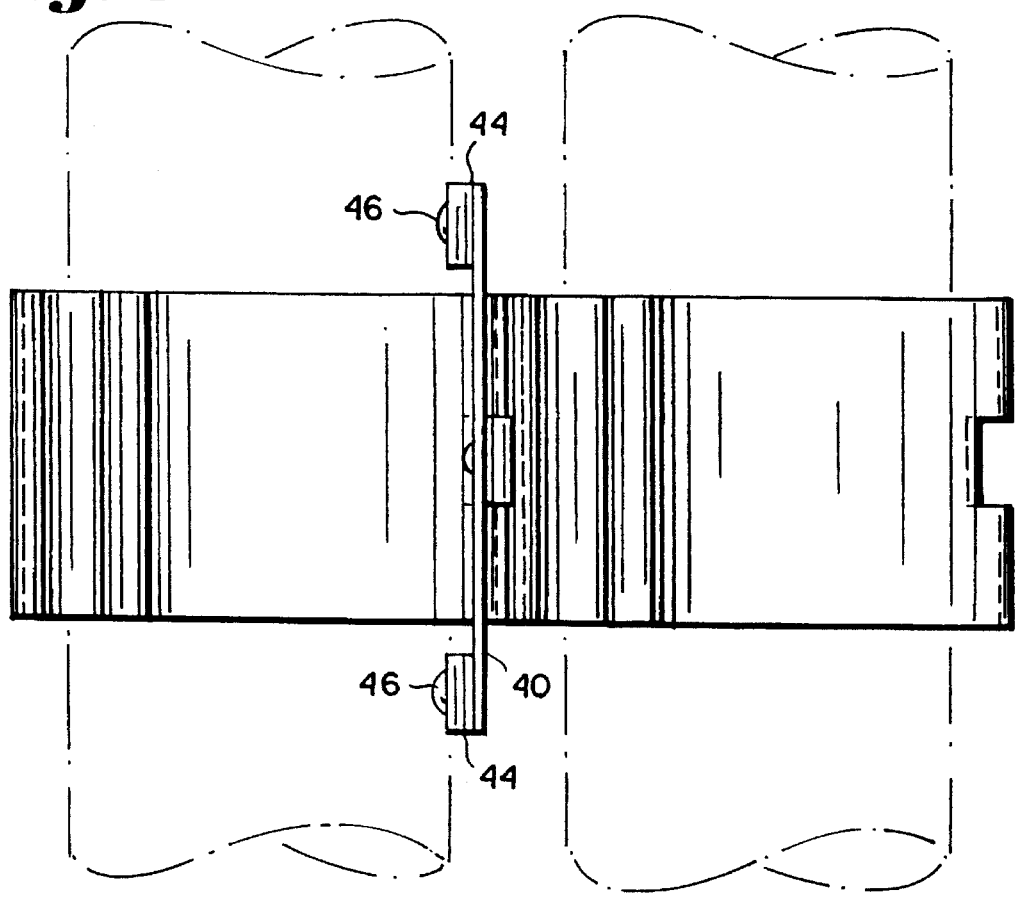
FIG. 5 is a side elevational view of the ferrules illustrated in FIG. 4.
Figure 6:
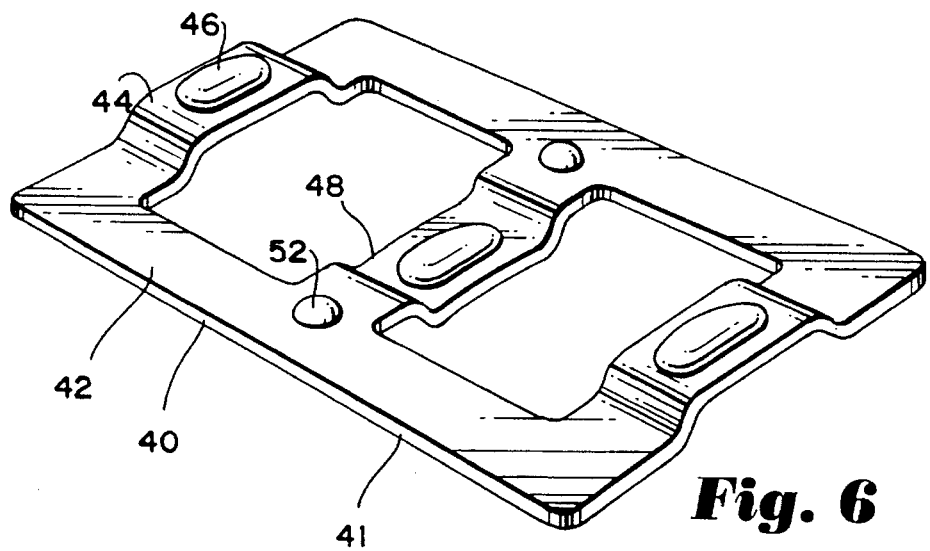
FIG. 6 is an enlarged perspective view of a spring for use with each ferrule.
Figure 7:
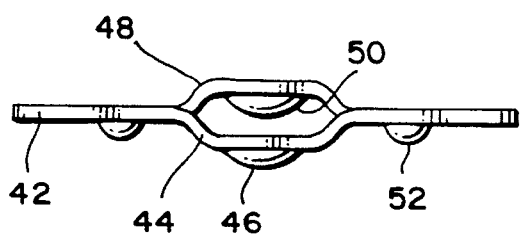
FIG. 7 is an end elevational view of the spring.
Figure 8:
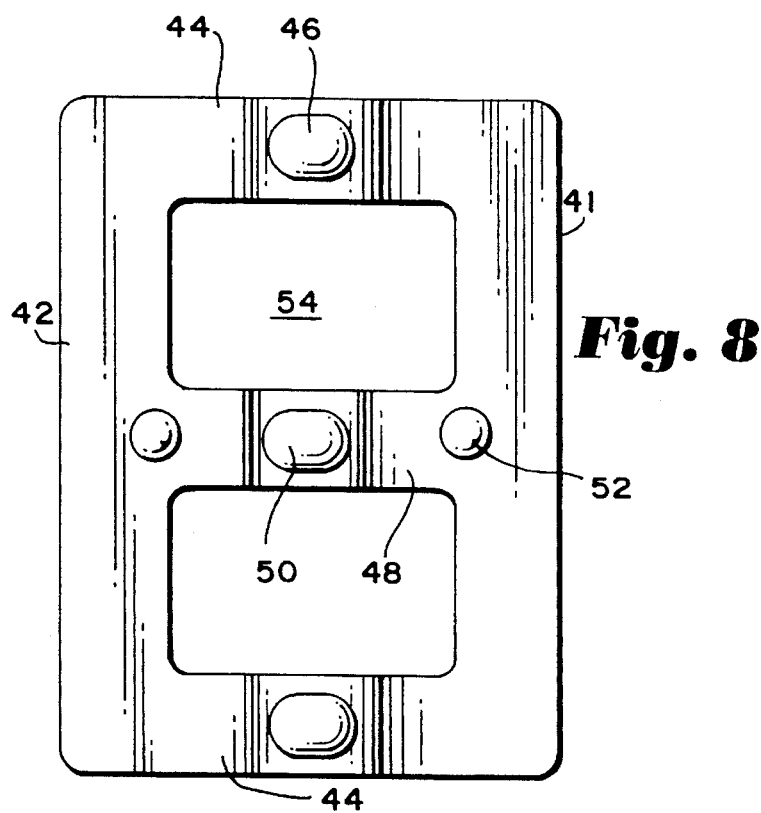
FIG. 8 is a front elevational view of the spring.
Figure 9:
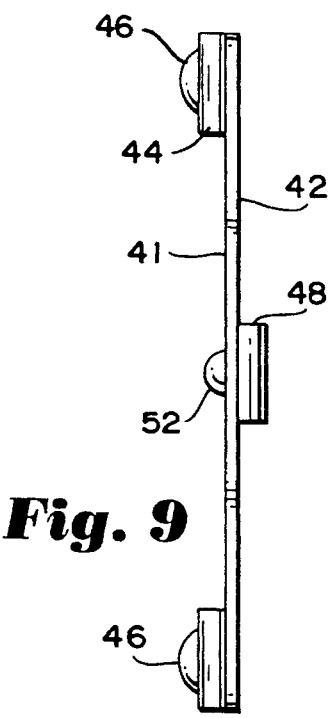
FIG. 9 is a side elevational view of the spring.
Figure 10:
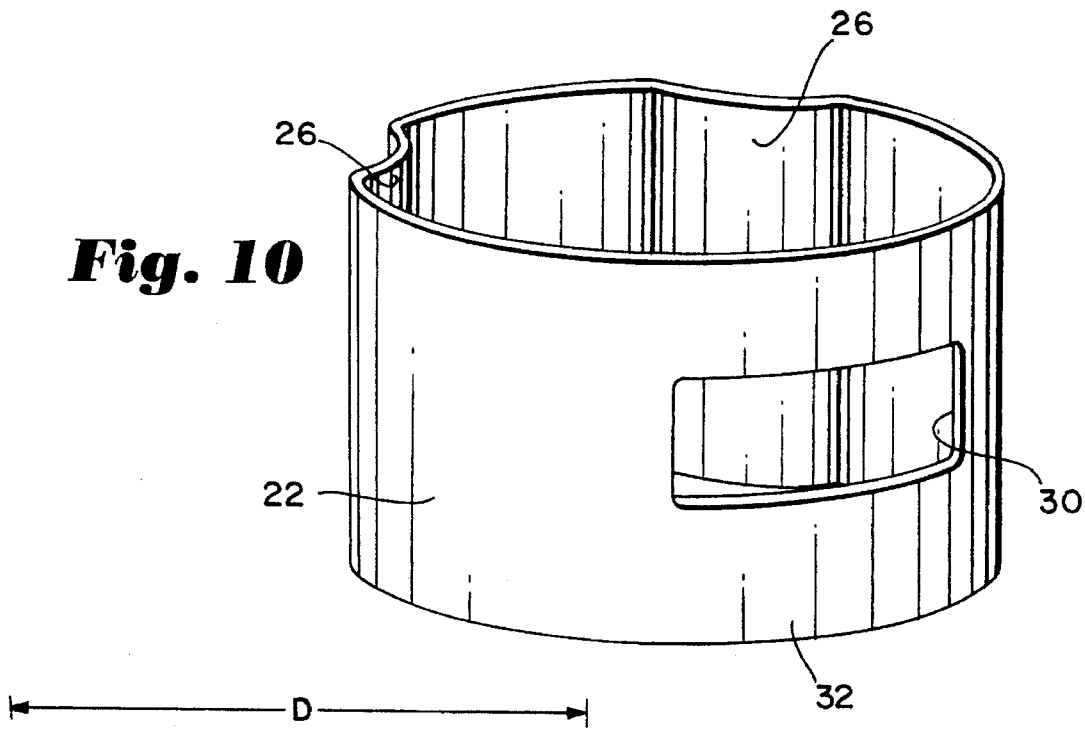
FIG. 10 is an enlarged perspective view of an individual spacer ferrule.
Figure 11:
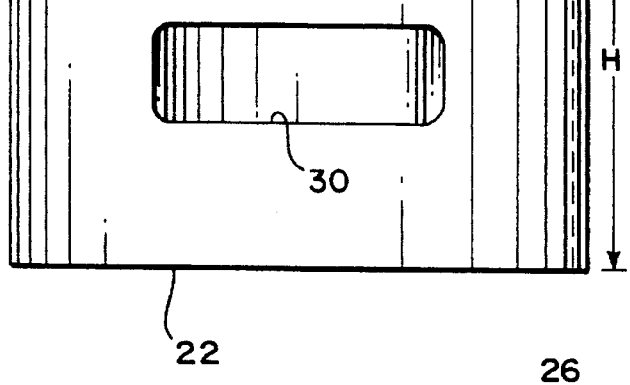
FIG. 11 is a side elevational view thereof.
Figure 12:
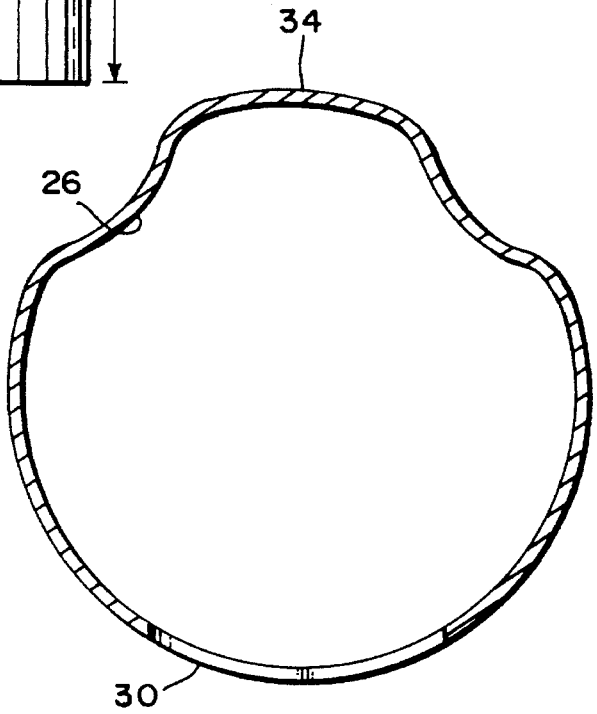
FIG. 12 is a cross sectional view through the ferrule.

Referring now to FIGS. 4 and 5, each spacer ferrule 22 has a generally cylindrical configuration. The wall of each cylindrical ferrule is indented at circumferentially spaced locations along one side of the ferrule to form the inwardly directed stops 26. It will be appreciated that the stops 26 extend the full height of the ferrule, although the stops could be provided at axially spaced locations along the height of the ferrule. As best illustrated in FIGS. 10–12, each ferrule 22 includes a central opening 30 opposite the stops 26. Opening 30 is straddled by band portions 32 above and below the opening. As indicated previously, the ferrules are symmetrically disposed within the spacer 18 with the side portion 34 of each spacer engaging the band portions 32 of the next-adjacent spacer. Also, the opposite sides of the ferrules (the sides of the ferrule 90° from side portion 34 and band portions 32) engage one another. Preferably, the ferrules are welded one to the other in the spacer 18 at their areas of engagement.

Referring now to FIGS. 6–9, there is illustrated a spring 40 for use with each of the ferrules 22. Spring 40 includes a flat leaf spring body 41 having sides 42 defining and lying in a plane. Opposite spring end portions 44 extend across the spring coupling between the opposite sides 42 and projecting to one side of the plane at opposite ends of the spring 40. An outwardly projecting convex dimple 46 is provided in each of the end portions 44 for engagement with the fuel rod in the associated ferrule 22. Substantially medially of the length of the spring 40, there is provided an intermediate cross-piece or central portion 48 which projects to the opposite side of the plane containing the spring 40. The cross-piece 48 has a convexly-shaped dimple 50 projecting toward the plane. Adjacent opposite sides of the cross-piece 48, there is provided a pair of projections or protuberances 52 which project from the plane on the same side thereof as the end pieces 44. From a review of FIG. 8, it will be appreciated that the cross-piece 48 and the end pieces 44 are spaced from one another to define a pair of openings 54 on opposite sides of the cross-piece 48 and bounded by the cross-piece 48, end pieces 44 and sides 42. The cross-piece 48 has a height dimension enabling it to be received within the opening 30 of the ferrule. Additionally, the protuberances 52 lie along opposite sides of the spring a distance from one another such that they engage the outer surface of the ferrule 22 adjacent opposite side edges of opening 30, as illustrated in FIG. 4. It will also be appreciated that the openings 54 in the spring 40 are sized to receive the ferrule band portions 32 above and below the ferrule opening 30.

In the spacer and as indicated previously, the ferrules 22 are welded one to the other to afford structural integrity within the spacer. The adjacent ferrules are secured one to the other with the springs in place. That is, the springs are located prior to assembly with the sides 42 straddling the opening 30 and the cross-piece 48 disposed within the opening 30. The sides 42 lie external to both ferrules, with the projections 52 engaging the outer surface of one ferrule adjacent opposite sides of opening 30. It will be appreciated that in this configuration, and as illustrated in FIG. 5, the end portions 44 lie above and below the upper and lower edges of the ferrules 22, respectively. Thus, the protuberances 46 engage the fuel rods above and below the ferrule and bias the fuel rods against the opposing stops 26. The cross-piece 48 of the spring bears against the portion 34 of the adjacent ferrule 22 between its stops 26 and thus provides a reaction force for the spring 40 bearing against the fuel rod of the one ferrule 22.

Consequently, it will be seen that the individual ferrules are reduced in height minimizing the magnitude of the ferrule material, yet maintain their structural integrity surrounding and positioning the fuel rods. In a typical spacer, the ferrules have a height-to-diameter ratio within a range of 0.8 to 0.4 and preferably the height-to-diameter ratio is about 0.6. The height H and diameter D dimensions are illustrated in FIG. 11.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A subassembly for a spacer useful in a nuclear fuel bundle for maintaining a matrix of a plurality of nuclear fuel rods passing through the spacer in spaced-apart relation, comprising:

first and second ferrules lying adjacent one another for receiving respective nuclear fuel rods, each ferrule having a pair of fuel rod contacting points along one side of the ferrule for abutting a fuel rod within the ferrule and a central opening along a side of the ferrule opposite said one side;

a spring including a spring body lying in a plane, said body including opposite sides spaced from one another in said plane and having opposite end portions projecting to one side of said plane, a central portion lying between and spaced from said end portions, said central portion projecting to the opposite side of said plane, said body including openings on opposite sides of said central portion between said central portion and said end portions and between said spring body sides;

said spring being disposed between said ferrules with said central portion in said central opening of said first ferrule and bearing against said second ferrule between said contacting points along said one side of said second ferrule, portions of said first ferrule on opposite sides of said central opening therethrough extending in respective openings of said spring, said end portions of said spring extending beyond opposite upper and lower edges of said first ferrule for bearing directly against a fuel rod passing through the first ferrule and biasing the fuel rod against the contacting points along said one side of said first ferrule, the opposite sides of said spring body lying between and externally of said first and second ferrules.

2. A subassembly according to claim 1 wherein said spring includes a pair of locating protuberances for engaging along an outer wall of said first ferrule to maintain said spring in position between said first and second ferrules.

3. A subassembly according to claim 1 wherein the opposite edges of said first and second ferrules define an axial dimension less than a dimension between said end portions of said spring.

4. A subassembly according to claim 1 wherein said first ferrule has a H/D ratio within a range of 0.8–0.4 wherein H is the height of the ferrule between said upper and lower edges thereof and D is the diameter of the first ferrule.

5. A subassembly according to claim 4 wherein the H/D ratio is about 0.6.

6. A subassembly according to claim 1 wherein said first and second ferrules have a H/D ratio within a range of 0.8–0.4 wherein H is the height of the ferrules between upper and lower edges thereof and D is the diameter of the ferrules.

7. A subassembly according to claim 6 wherein the H/D ratio for each said first and second ferrules is about 0.6.

8. A subassembly according to claim 1 wherein said contacting points comprise indentations along the sides of the ferrules extending the full axial length of the ferrules between the opposite edges.

9. A spacer for maintaining a matrix of nuclear fuel rods in spaced-apart relation between upper and lower tie plates, said spacer assembly comprising:

a matrix of adjacent ferrules for receiving the fuel rods in said spacer;

each ferrule having a pair of fuel rod contacting points along one side thereof for abutting a fuel rod within the ferrule and having an opening along a side of the ferrule opposite said one side;

a plurality of springs, each spring including a spring body lying in a plane, said body including opposite sides spaced from one another in said plane and having opposite end portions projecting to one side of said plane, a central portion between and spaced from said end portions, said central portion projecting to the opposite side of said plane, said body including openings on opposite sides of said central portion and between said central portion and said end portions and between said spring body sides;

each said spring being disposed between an adjacent pair of said ferrules with said central portion in said central opening of one of said adjacent ferrules and portions of said one ferrule on opposite sides of said opening therethrough extending in respective openings of said spring, the opposite sides of said spring body lying between and externally of said adjacent pair of said ferrules.

10. A spacer according to claim 9 wherein said end portions of each said spring extend above upper and lower edges of said ferrules for engaging the fuel rods at locations above and below the ferrules, respectively.

11. A spacer according to claim 9 wherein each ferrule has a H/D ratio within a range of 0.8–0.4 wherein H is the height of the ferrule between upper and lower edges thereof and D is the diameter of the ferrule.

12. A spacer according to claim 11 wherein the H/D ratio is about 0.6.

13. A spacer according to claim 9 wherein said sides of said springs include protuberances for engaging along outer sides of said ferrules to maintain said springs in position between said ferrules.

14. A spacer according to claim 9 wherein the opposite edges of said ferrules define an axial dimension less than said dimension between said end portions of said springs.

* * * * *